No. 814,731. PATENTED MAR. 13, 1906.
N. A. ROBERTSON.
APPARATUS FOR EXTRUDING METALS.
APPLICATION FILED JAN. 27, 1905.

3 SHEETS—SHEET 1.

WITNESSES:
Fred White
René Bruine

INVENTOR:
Norman A. Robertson,
By Attorneys,

No. 814,731. PATENTED MAR. 13, 1906.
N. A. ROBERTSON.
APPARATUS FOR EXTRUDING METALS.
APPLICATION FILED JAN. 27, 1905.

3 SHEETS—SHEET 2.

WITNESSES:
Fred White
Rene Bruine

INVENTOR:
Norman A. Robertson,
By Attorneys,

No. 814,731. PATENTED MAR. 13, 1906.
N. A. ROBERTSON.
APPARATUS FOR EXTRUDING METALS.
APPLICATION FILED JAN. 27, 1905.

3 SHEETS—SHEET 3.

WITNESSES:
Fred White
René Muine

INVENTOR:
Norman A. Robertson,
By Attorneys.

UNITED STATES PATENT OFFICE.

NORMAN A. ROBERTSON, OF NEW YORK, N. Y.

APPARATUS FOR EXTRUDING METALS.

No. 814,731.  Specification of Letters Patent.  Patented March 13, 1906.

Application filed January 27, 1905. Serial No. 242,987.

*To all whom it may concern:*

Be it known that I, NORMAN A. ROBERTSON, a citizen of the United States, residing in the borough of Brooklyn, county of Kings, city and State of New York, have invented certain new and useful Improvements in Apparatus for Extruding Metals, of which the following is a specification.

This invention relates to an improved machine for extruding metal—that is to say, forcing it through a die either in a solid or hollow wire or upon a core-wire of other material.

The improved machine is specially designed for extruding aluminium or other metals which require an extreme pressure and generally a high temperature.

Machines for extruding lead and other soft metals are well known; but these are not adapted to the particular work for which the present machine is designed for reasons which are stated in detail hereinafter.

An important feature of the present machine is the introduction of the metal in separate streams, the passages leading to the die-chamber being unconnected back of said chamber, and the arrangement of the passages a considerable distance apart from each other and from the core between them, so as to provide a heavy wall around the core capable of resisting extreme pressures at high temperatures.

A second feature of advantage is the construction of the machine whereby the core, though extending in the general direction of the passages, is exposed only at its end to the pressure of the material.

Certain other features are referred to in detail hereinafter.

The accompanying drawings illustrate embodiments of the invention.

Figure 1:
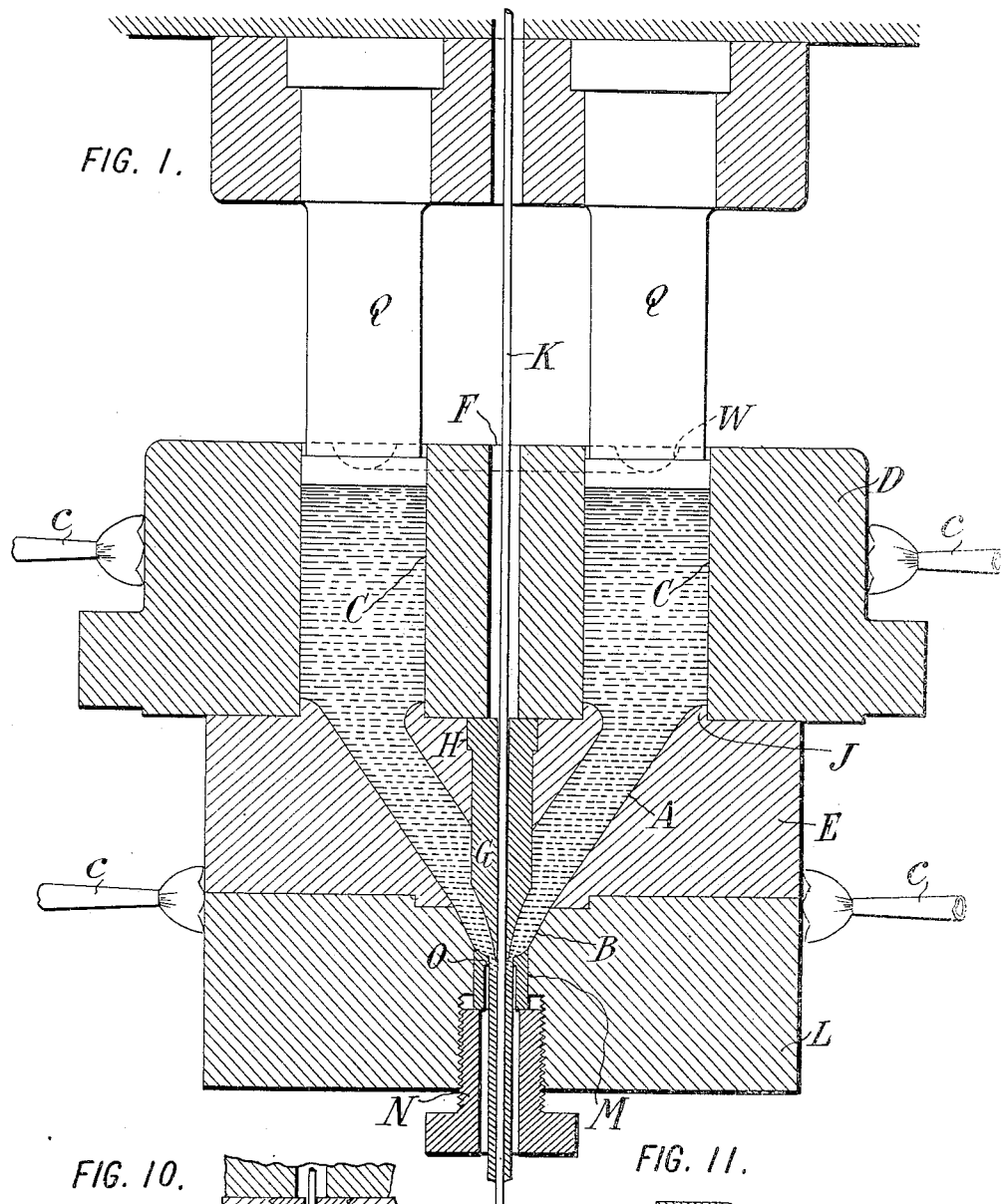
Figure 10:
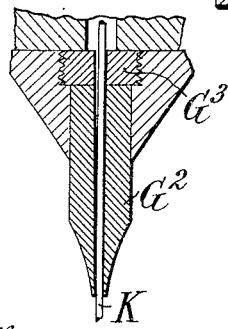
Figure 11:
Figure 2:
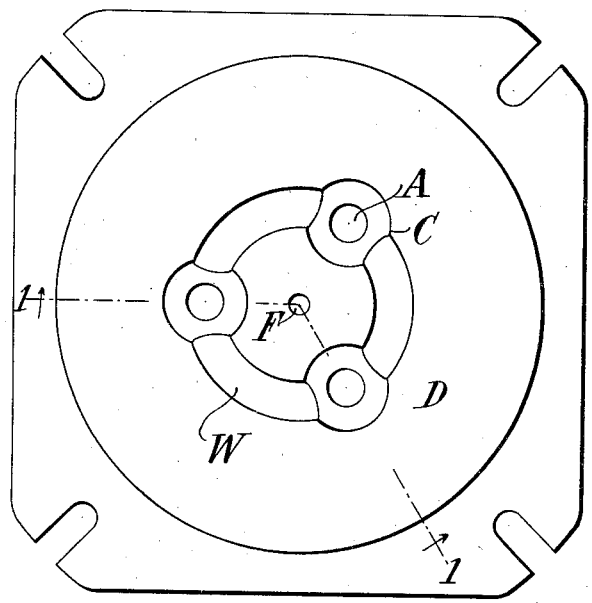
Figure 4:
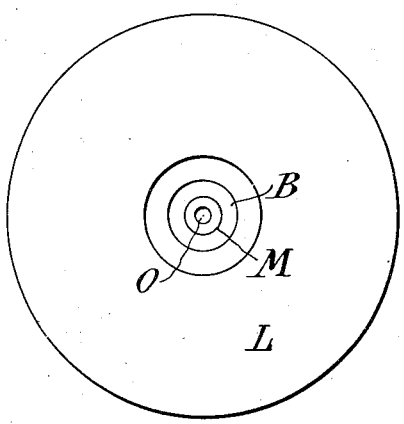
Figure 3:
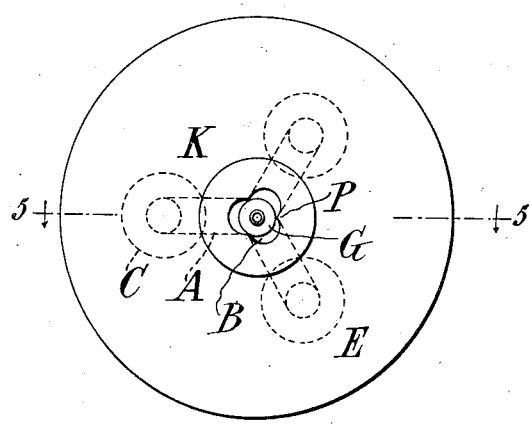
Figure 5:
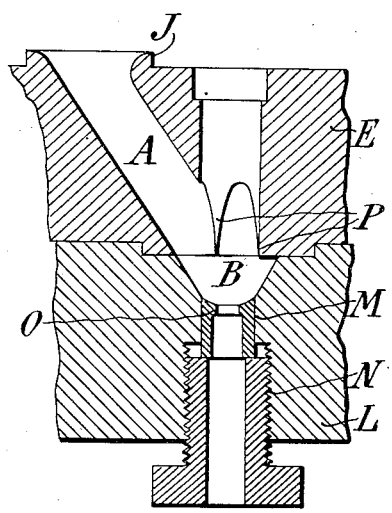
Figure 6:
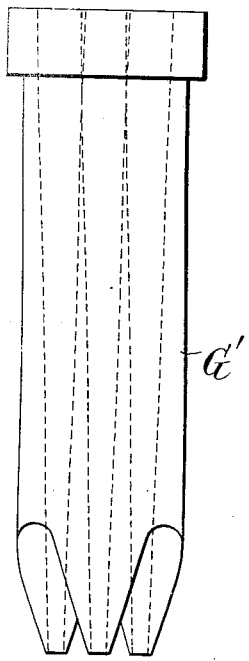
Figure 7:
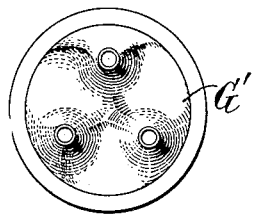
Figure 12:
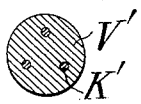
Figure 8:
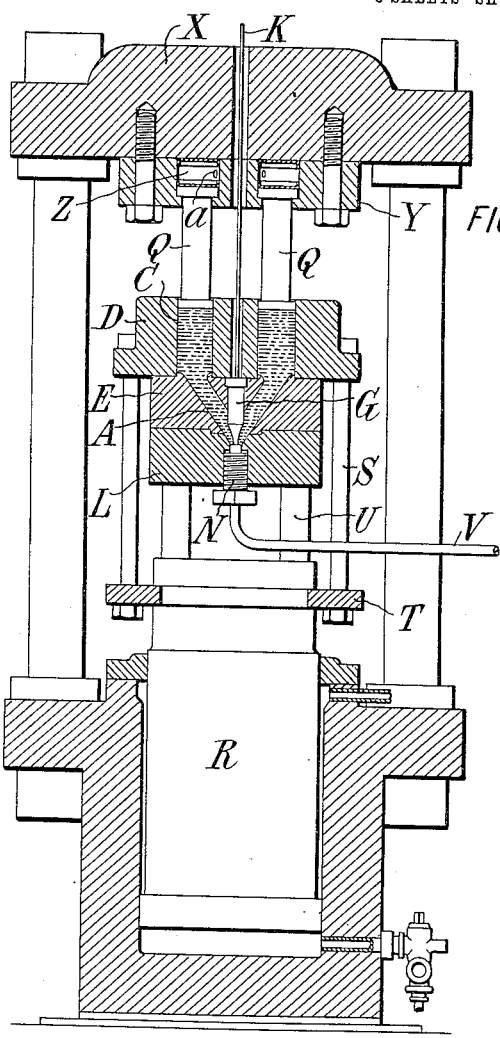
Figure 9:
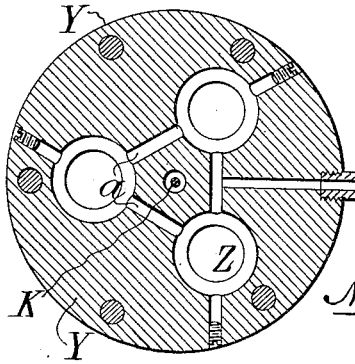
Figure 13:

Figure 1 is a section through the center of the principal parts of the machine, being taken in two planes on the line 1 1 of Fig. 2. Fig. 2 is a top plan of the part or block which carries the cylinders. Fig. 3 is an under side plan of the part or block which contains the converging passages leading to the die-chamber. Fig. 4 is a top plan of the third part or block which forms the bottom of the die-chamber and carries the die. Fig. 5 is a fragmentary section on the line 5 5 of Fig. 3, but omitting the upper block and the core. Figs. 6 and 7 are respectively a side elevation and under side plan view of a multiple core. Fig. 8 is a vertical section of the complete machine with certain parts in elevation. Fig. 9 is a horizontal section of a block carrying compensating cylinders, hereinafter described. Fig. 10 is a section illustrating another method of holding down the core of the machine. Fig. 11 is an elevation of a plug for replacing the core. Figs. 12 and 13 are cross-sections of alternative products.

The machine is preferably arranged vertically, as indicated, though it may operate in a horizontal direction as well. The machine is also shown with a core which may be used to form a hollow or tubular product or to carry a core-wire of the product; but in connection with some of the features claimed the core of the machine may be omitted to form a solid wire of aluminium or the like. Certain features are, however, applicable especially to a machine having a core.

In the extrusion of aluminium I have observed that if the metal be somewhat liquid it spurts or blows out through the die. As it cools below the point of liquidity it becomes more or less granular or crystalline in consistency, and at this stage also the metal blows out instead of being squeezed out in a constant stream. This blowing out is thought to be due to the gases which aluminium absorbs in large quantities while molten. It is therefore necessary to extrude the aluminium at a temperature below its granular stage when it has become so hard as to prevent spurting. This temperature necessitates maintaining the die and the core of the machine (where such a core is used) at or preferably just below a dull-red heat. The stiffness of the aluminium, further, necessitates extraordinary pressure. Under these circumstances it will be apparent that the metal of the machine itself is of much less strength than when cold. The machine has therefore been designed to have the greatest strength and to protect the parts, and especially the core, as much as possible from the extreme pressure and to arrange them so as to resist as well as possible the pressure which they receive. Also the machine is arranged to force the metal as nearly as possible in the same general direction (which I have called the "longitudinal" direction) from the entrance to the exit of the machine, so as to reduce as low as possible the amount of pressure needed. With these ends particularly in view the machine illustrated is shown provided with passages A converging toward the center and meeting in the die-chamber B, these passages being extended backward to the end of the machine—that is, upward to the top with the vertical arrangement shown — through longitudinal cylinders C, which are preferably unconnected with each other. The term "passage" is used in its generic sense to include the cylinders in which the plungers reciprocate, as well as the oblique passages or conduits A, and to include the combination of a conduit A and the cylinder which forms a continuation thereof. Thus the metal is introduced in separate streams from separate cylinders instead of from one cylinder through passages which divide or branch to separate the metal into two streams before leading it to the die-chamber, as is common in lead-extruding machines. By my new construction the machine is greatly strengthened.

The cylinders C are formed in a portion or block D of the machine separate from the portion or block E which has the converging passages A. The cylinders are widely separated from each other, so as to leave a heavy wall of material between them and within the center surrounding the passage F, through which a core-wire is to be passed. Hence even though the material be red-hot and the walls of the several passages be thus weakened, yet there can be no collapsing of the central wall surrounding the passage F.

The use of two separate blocks D and E enables me to use a short core G, extending upward only to the upper face of the block E. This core is abundantly protected by the thickness of the material of the block E, which surrounds it. Fig. 3 shows that the core is surrounded by three wedge-shaped portions of the block extending between the passages and from the core to the outer circumference, where the heat is generally applied. The upper end of the core G is formed with a collar H, which fits in a suitable socket in the top of the block E. The block D rests upon the upper end of the core G to hold the latter down. In order to avoid the strain which this construction brings on the rods holding the blocks D and E together, the core $G^2$, Fig. 10, may be held down by a nut $G^3$, screwing into a socket in the upper face of the block. At the upper end of each of the passages A there is an upwardly-projecting boss J, fitting into the bottom of the corresponding cylinder C to determine the position of the upper block on the block E. Where a core-wire K is to be coated with the external material, the core G of the machine is provided with a central passage in line with the passage F. Where hollow tubing is to be formed, however, the passage F may be omitted and the core G of the machine may be made solid, and where a solid extruded bar or wire is to be formed the core G of the machine may be omitted, the block E being solid except for the converging passages A and the chamber in which they meet, or to like effect the core G may be replaced by a solid plug $G^4$. (Shown in Fig. 11.)

A lower block L forms the bottom of the die-chamber B and in connection with the block E constitutes the part of the machine analogous to what is generally known as the "die-block." I have designated the parts D, E, and L, however, as the "upper," "intermediate," and "lower" blocks for the sake of clearness. The lower block L carries the die M, which is held up on the end of a hollow screw N. Above the die M the block is more or less recessed to guide the material properly to the constricted mouth O of the die.

The lower end of the core G of the machine projects more or less into the die-chamber and generally into the mouth of the die to determine the amount of material passing through the die. With the use of such a stiff material as aluminium and under the severe conditions described it is essential to make the core as strong and to support it as strongly as possible against side thrust. This side thrust is liable to occur from a variety of causes, as the greater liquidity of the metal in one of the cylinders C and passages A or the greater friction in one of said cylinders and passages, whereby the pressure from the opposite side would be more effective and would bend the end of the core and destroy the regularity of the product. With an even number of passages A converging upon the core it is apparent that a reduction of pressure in one would tend to cause the bending of the core by reason of the preponderance of pressure in the passage diametrically opposite. The only resistance to the pressure from one passage would be furnished by the pressure in the passage diametrically opposite. I propose, therefore, to provide an odd-numbered plurality of passages A, preferably three, as shown, and in planes equiangularly placed relatively to each other, so that the pressure from each passage upon the core will be opposed by the solid metal of the block E, which extends down in a point P diametrically opposite each passage A. This point P of metal is best indicated in Figs. 3 and 5.

The machine-core may be formed as at G' in Figs. 6 and 7, having a plurality of central passages for carrying wires to form the cores of the product or be embedded in the product. This multiple core G' may be used with a series of separate dies, so as to form at once several separate wires, or it may be used with a single die to form a product in which a plurality of core-wires are embedded.

In operation, assuming that a wire of aluminium with a steel core-wire is to be made, the steel wire K is run through the core and die in the usual way. The passages A and cylinders C are then filled with aluminium, molten or in the form of slugs or otherwise. If introduced molten, it is allowed to cool to the desired temperature. If solid, it is heated to that temperature, preferably before introduction. The plungers Q, Fig. 8, are then forced into the cylinders, preferably by raising the structure composed of the several blocks D, E, and L by means of a hydraulic plunger R, and the aluminium is forced down through the converging passages A. In the chamber B the streams coalesce and thence pass out around the core of the machine through the die, carrying with them the core-wire K. When the desired amount of aluminium has been extruded, the plunger R is forced down, carrying with it the three blocks D, E, and L, it being connected to the upper block D by means of bolts S and a ring T. An open stool U is interposed between the lower block L of the apparatus and the top of the plunger R to permit the withdrawal of the complete product V laterally.

In order to insure an equal filling of the cylinders C, there is preferably provided a shallow trough W, Fig. 2, connecting the upper open ends of the cylinders, (though these cylinders are entirely unconnected after the operation has commenced.) The purpose of this trough is to insure that all the plungers Q shall come to a bearing on the metal in their several cylinders at the same time, so that the metal shall not be forced through one of the passages A before it commences to flow through the others. With the trough W the entry of the plungers Q into the cylinders A at first forces out metal into the trough W, and until each of the plungers has passed below the trough W this trough forms a sort of safety-valve or overflow to prevent extreme pressure by any one of the plungers.

Another construction which may be used with or without the trough W and which is designed to bring the several plungers Q to an even bearing before commencing the extruding operation is illustrated in Figs. 8 and 9. The plungers Q are supported at their upper ends in cylinders which are connected with each other and arranged to be supplied with oil or other liquid, the several cylinders being in communication with each other, so that if one plunger engages the metal to be extruded before the others the reaction from the first plunger will force down the others and all the plungers will come to an even bearing and begin the extruding operation at the same time. For this purpose the head X of the machine may be provided on its under side with a casting Y, in which are formed three cylinders Z, connected at their upper ends by passages $a$ and connected to a pipe $b$, through which liquid may be admitted or discharged.

The metal to be extruded is maintained at the desired temperature by heating the apparatus from the outside. For example, a series of gas-blow pipes $c$ may be arranged around the lower and intermediate blocks L and E and another series of similar blow-pipes around the upper block D.

Figs. 12 and 13 illustrate wires $V'$ and $V^2$ of respectively circular and trefoil shape in cross-section, which may be made with a plurality of core-wires $K'$ by the use of the core $G'$ and dies corresponding to the contours of the sections shown.

Though I have described with great particularity of detail certain apparatus embodying the invention, yet it is not to be understood therefrom that the invention is limited to the specific embodiments disclosed. Various modifications thereof in detail and in the arrangement and combination of the parts may be made by those skilled in the art without departure from the invention.

What I claim is—

1. An extruding-machine comprising a block having a plurality of separate cylinders, and a second block having corresponding inclined passages leading from said cylinders to the die-chamber.

2. An extruding-machine comprising a block having a plurality of separate cylinders, a second block having corresponding inclined passages leading from said cylinders to the die-chamber, said passages and cylinders being spaced apart a considerable distance from each other whereby a heavy wall is provided between them capable of resisting extreme pressures at high temperatures.

3. An extruding-machine comprising a block having a plurality of separate cylinders, a second block having corresponding inclined passages leading from said cylinders to the die-chamber, said passages and cylinders being spaced apart a considerable distance from each other, and a core arranged between said passages, with a heavy wall between said passages and said core capable of resisting extreme pressures at high temperatures.

4. An extruding-machine comprising an upper and a lower block and having a plurality of passages leading vertically through said upper block and obliquely through said lower block to the die-chamber, and a core carried in the lower block and projecting into said chamber.

5. An extruding-machine having a die-chamber, a plurality of passages converging into said chamber, and cylinders extending longitudinally, unconnected with each other, leading into said passages and formed separately from the portion of the machine having said passages.

6. A vertical extruding-machine having a lower block carrying a vertical die and forming the bottom of the die-chamber, an intermediate block forming the top of said chamber and having converging passages leading to said chamber, and an upper block fitting on top of said intermediate block and through which said passages are extended in a longitudinal direction to the top.

7. An extruding-machine having one part in which are passages leading to a die-chamber, a second part separate from the first and through which the material is conducted to said passages, a core carried by said first-mentioned part and lying between said passages so that they converge toward it, and means for forcing material through all of said passages simultaneously so that the pressures on the core from said passages balance each other.

8. An extruding-machine having a block E in which are converging passages A leading to a die-chamber, a second block D separate from the first and in which are formed cylinders C connecting with the ends of the passages A, a core carried by said first-mentioned block and lying between said passages A so that they converge toward it, and means for forcing material through all of said passages simultaneously so that the pressures on the core from said passages balance each other.

9. An extruding-machine having an end block in which is a die, an intermediate block in which is a core, and an opposite end block in which is a cylinder for conducting material to the die-chamber, the intermediate block being confined between the two end blocks.

In witness whereof I have hereunto signed my name in the presence of two subscribing witnesses.

NORMAN A. ROBERTSON.

Witnesses:
   DOMINGO A. USINA,
   THEODORE T. SNELL.